US010281950B2

(12) United States Patent
Ko (10) Patent No.: US 10,281,950 B2
(45) Date of Patent: May 7, 2019

(54) ELECTRONIC DEVICE HAVING FLEXIBLE DISPLAY PANEL

(71) Applicant: Young Sang Ko, Seoul (KR)

(72) Inventor: Young Sang Ko, Seoul (KR)

( * ) Notice: Subject to any disclaimer, the term of this patent is extended or adjusted under 35 U.S.C. 154(b) by 0 days.

(21) Appl. No.: 15/575,574

(22) PCT Filed: Sep. 12, 2016

(86) PCT No.: PCT/KR2016/010293
§ 371 (c)(1),
(2) Date: Nov. 20, 2017

(87) PCT Pub. No.: WO2017/057859
PCT Pub. Date: Apr. 6, 2017

(65) Prior Publication Data
US 2018/0129246 A1    May 10, 2018

(30) Foreign Application Priority Data

Oct. 1, 2015    (KR) .................. 10-2015-0138601

(51) Int. Cl.
*G06F 1/16*          (2006.01)
*G09F 9/30*          (2006.01)

(52) U.S. Cl.
CPC .......... *G06F 1/1616* (2013.01); *G06F 1/1652* (2013.01); *G06F 1/1681* (2013.01); *G09F 9/30* (2013.01)

(58) Field of Classification Search
CPC .... G06F 1/1652; G06F 1/1681; G06F 1/1616; H04M 1/0268; G09F 9/301; G09F 9/30
See application file for complete search history.

(56) References Cited

U.S. PATENT DOCUMENTS

| 2010/0117975 | A1  | 5/2010  | Cho |
| 2011/0126141 | A1* | 5/2011  | King .................. G06F 1/1616 715/769 |
| 2012/0002360 | A1  | 1/2012  | Seo et al. |
| 2012/0120618 | A1* | 5/2012  | Bohn .................. G06F 1/1618 361/749 |
| 2013/0010405 | A1* | 1/2013  | Rothkopf ............ H04M 1/0216 361/679.01 |
| 2013/0021762 | A1  | 1/2013  | Van Dijk et al. |
| 2016/0366772 | A1* | 12/2016 | Choi .................. G06F 1/1616 |

FOREIGN PATENT DOCUMENTS

| KR | 10-2010-0052227 A | 5/2010 |
| KR | 10-2012-0002084 A | 1/2012 |
| KR | 10-1292974 B1     | 8/2013 |
| KR | 10-2015-0037383 A | 4/2015 |
| KR | 10-2015-0099676 A | 9/2015 |

OTHER PUBLICATIONS

International Search Report for PCT/KR2016/010293 dated Jan. 4, 2017 from Korean Intellectual Property Office.

* cited by examiner

*Primary Examiner* — James Wu
(74) *Attorney, Agent, or Firm* — Paratus Law Group, PLLC (57) ABSTRACT

The present invention provides an electronic device having a flexible display panel wherein a user can easily fold or unfold a plurality of unit bodies to expand or contract the display area of the flexible display panel, and when the unit bodies are folded, a portion of the flexible display panel is received in the hollow unit body.

11 Claims, 9 Drawing Sheets

ELECTRONIC DEVICE HAVING FLEXIBLE DISPLAY PANEL

CROSS REFERENCE TO PRIOR APPLICATIONS

This application is a National Stage Patent Application of PCT International Patent Application No. PCT/KR2016/010293 (filed on Sep. 12, 2016) under 35 U.S.C. § 371, which claims priority to Korean Patent Application No. 10-2015-0138601 (filed on Oct. 1, 2015), which are all hereby incorporated by reference in their entirety.

FIELD OF INVENTION

The present invention relates to an electronic device having a flexible display panel, and more particularly to an electronic device capable of extending or reducing a display region of a flexible display panel.

RELATED ART

In recent years, electronic devices equipped with a display panel on the top face of the unit body thereof, such as smart phones, tablet PCs, and portable game devices have been developed and used. These electronic devices are configured to display contents such as images on the display panel disposed on the unit body.

These electronic devices have limitations in increasing the size of the display screen while improving portability. Keyboard input was relatively slow due to a large reliance on the touch screen as the display screen. That is, when the display panel is made smaller for portability, the amount of content that can be displayed on the display is reduced, and the size of letters and images are inevitably reduced.

In order to solve such a problem, Korean Patent No. 10-1292974 discloses a structure in which a flexible display is applied to a folder type terminal.

However, in the above patent document, when the terminal is folded, the flexible display is exposed from both the top and bottom faces of the terminal. Accordingly, in the folding state of the terminal, the flexible display panel is exposed from the top face of the terminal while the display panel is exposed from the bottom face, causing scratches and damaging the display panel. Particularly, since the terminal is a folder type, the user feels inconvenience because the operation thereof is not simple.

[Prior Art Document] Patent Document 1: Korean Patent No. 10-1292974

DISCLOSURE OF THE INVENTION

The present invention has been made to solve the conventional problems as described above. It is an object of the present invention to provide an electronic device having a flexible display panel wherein a user can easily fold or unfold a plurality of unit bodies to expand or contract the display area of the flexible display panel, and when the unit bodies are folded, a portion of the flexible display panel is received in the hollow unit body.

The present invention also aims to provide an electronic device with a flexible display panel wherein when the electronic device is not used, the plurality of unit bodies are folded such that the top faces of the plurality of unit bodies face each other, and the entire flexible display panel is drawn into the hollow unit body, thereby minimizing damage to the flexible display panel.

In one aspect, there is provided an electronic device comprising: a first unit body and a second unit body; a linking mechanism connecting the first unit body and the second unit body to each other, wherein the linking mechanism is configured to allow the first unit body and the second unit body to be switched between a folded mode or an unfolded mode, wherein in the folded mode, the first unit body and the second unit body overlap each other, while, in the unfolded mode, the first unit body and the second unit body are unfolded to be linear; an accommodation chamber formed in the second unit body; an opening defined at a lateral end of the second unit body; a flexible display panel having one end fixed at one end of a top face of the first unit body and having the other end being retracted into or withdrawn out of the accommodation chamber based on the folded or unfolded mode; and extending and retracting means disposed in the accommodation chamber, wherein the extending and retracting means is connected to the flexible display panel, wherein the extending and retracting means is configured to pull the flexible display panel such that the flexible display panel is automatically retracted into the accommodation chamber when the flexible display panel is pulled out.

In one embodiment, in the unfolded mode, both top faces of the first unit body and of the second unit body face upwards, wherein in the folded mode, only the top face of the second unit body faces upwards, wherein in the unfolded mode, the flexible display panel is withdrawn out of the accommodation chamber and extends across the top faces of the first unit body and the second unit body, thereby creating an extended screen mode, wherein in the folded mode, the flexible display panel is partially withdrawn out of the accommodation chamber and extends only across the top face of the first unit body, thereby creating a reduced screen mode.

In one embodiment, in the unfolded mode, both top faces of the first unit body and of the second unit body face upwards, wherein in the folded mode, only the top face of the second unit body faces upwards, wherein in the unfolded mode, the flexible display panel is withdrawn out of the accommodation chamber and extends across the top faces of the first unit body and the second unit body, thereby creating an extended screen mode, wherein in the folded mode, the flexible display panel is partially withdrawn out of the accommodation chamber and extends only across the top face of the first unit body, thereby creating a reduced screen mode, wherein in an inverse-folded mode, the first unit body and the second unit body overlap each other such that the top faces of the first unit body and the second unit body face each other, wherein in the inverse-folded mode, an entirety of the flexible display panel is received in the accommodation chamber.

In one embodiment the linking mechanism includes: an elongate slot formed in the first unit body; and a linker connecting the first unit body and the second unit body, wherein one end of the linker is movable along the elongate slot, and is pivotable in the elongate slot, and the other end of the linker is pivotally mounted on the second unit body.

In one embodiment the linking mechanism includes: a first elongate slot formed in the first unit body; a second elongate slot formed in the second unit body; and a linker connecting the first unit body and the second unit body, wherein one end of the linker is movable along the first elongate slot, and is pivotable in the first elongate slot, and the other end of the linker is movable along the second elongate slot, and is pivotable in the second elongate slot.

The device of claim 4 or 5, wherein the linker is elastic and extendable, wherein the linker allows the first unit body and the second unit body to pull each other such that the first unit body and the second unit body is brought into close contact side by side with each other in the unfolded mode when the first unit body and the second unit body are unfolded to be linear.

In one embodiment, the linker includes: a first stick portion; a second stick portion slidable in a longitudinal direction along the first stick portion; and an elastic spring connecting the first stick portion and the second stick portion.

In one embodiment, the linker includes: a plurality of stick portions that are slidably movable mutually in an length direction thereof and extend and retract; and elastic springs, each connecting adjacent stick portions, wherein each elastic spring provides restoring force corresponding adjacent stick portions when the corresponding adjacent stick portions are stretched together.

In one embodiment, the linker has: a first pivotal shaft movable along the elongate slot and pivotable in the elongate slot while being inserted into the elongate slot, wherein the first shaft is disposed on one end of the linker; and a second pivotal shaft position-fixed onto the second unit body, wherein the second pivotal shaft is pivotable.

In one embodiment, the extending and retracting means includes a coil spring or an elastic pad, a combination of a coil spring and an elastic pad.

In one embodiment, the extending and retracting means further includes a stopper disposed at a longitudinal end of the coil spring or the elastic pad, or between the flexible display panel and the elastic pad, wherein the stopper prevents a portion or entirety of the elastic pad from being removed from the accommodation chamber.

In one embodiment, the extending and retracting means comprises: a coil spring whose one end is fixed to an inner end of the accommodation chamber; an elastic pad connecting one end of the coil spring and the flexible display panel; and a stopper disposed between the coil spring and the elastic pad, wherein the stopper has a size larger than the opening so as not to pass through the opening, thereby preventing the coil spring from escaping out of the accommodation chamber.

In one embodiment, the extending and retracting means comprises: a spiral spring type bobbin rotatably disposed in the accommodation chamber, wherein the flexible display panel is unwound from the spiral spring type bobbin or the flexible display panel is wound around the spiral spring type bobbin, wherein the spiral spring type bobbin is configured to allow the flexible display panel to be automatically switched from a unwound state to a wound state via an elastic force.

In one embodiment, the extending and retracting means comprises: an elastic pad having one end secured to an inner end of the accommodation chamber and the other end fixed to the flexible display panel; and a plurality of rollers received in the accommodation chamber, wherein the rollers are configured such that the elastic pad and the flexible display panel are retracted or withdrawn into or out of the chamber in a zigzag fashion.

In another aspect, there is provided an electronic device comprising: at least two unit bodies; at least one linking mechanism, each mechanism connecting adjacent unit bodies, wherein the linking mechanism is configured to allow the at least two unit bodies to be switched between a folded mode or an unfolded mode, wherein in the folded mode, at least two unit bodies overlap each other, while, in the unfolded mode, the at least two unit bodies are unfolded to be linear; an accommodation chamber formed in a first unit body among the at least two unit bodies; an opening defined at a lateral end of the first unit body; an elastic member fixed to an inner end of the chamber; and a flexible display panel having one end fixed at one end of a top face of a second unit body among the at least two unit bodies, and having the other end fixed to the elastic member, wherein the flexible display panel is retracted into or withdrawn out of the accommodation chamber based on the folded or unfolded mode, wherein the retraction of the flexible display panel corresponds to a reduced screen mode and the withdrawal of the flexible display panel corresponds to an extended screen mode.

Effects of Disclosure

In accordance with the present invention, in an electronic device with a flexible display panel, the unit bodies are connected by the linking mechanism consisting of an elongate slot and a linker, thus, the user can fold or unfold the unit bodies in various ways. In the folded state of the unit bodies, at least a portion of the flexible display panel is received and stored in the hollow unit body. Therefore, the display panel is not unnecessarily exposed to the outside. Thus, the display panel may be prevented from being damaged.

In accordance with the present invention, when the electronic device is not used, the plurality of unit bodies are folded such that the top faces of the plurality of unit bodies face each other, and the entire flexible display panel is drawn into the hollow unit body, thereby minimizing damage to the flexible display panel.

DETAILED DESCRIPTIONS

The above and other objects, features and advantages of the present invention will become readily apparent from the following description of preferred embodiments with reference to the accompanying drawings. However, the present invention is not limited to the embodiments described herein but may be embodied in other forms. Rather, the embodiments disclosed herein are provided so that the disclosure can be thorough and complete, and will fully convey the concept of the present invention to those skilled in the art.

In the present specification, when an element is referred to as being on another element, it may mean that the former element may be directly formed on said another element or a third element may be interposed therebetween. Also, in the drawings, the thickness of the components may be exaggerated for an effective description of the present disclosure.

The embodiments described herein will be described with reference to cross-sectional views and/or plan views, which are ideal illustrations of the present invention. In the drawings, the thicknesses of the films and regions are exaggerated for an effective explanation of the technical content. Thus, the shape of the illustrations may be modified by manufacturing processes and/or tolerances. Accordingly, the embodiments of the present invention are not intended to be limited to the particular forms shown, but may include variations in form that are generated according to the fabrication process. For example, the portion shown at right angles may be rounded or may have a shape with a certain curvature. Thus, the regions illustrated in the figures have attributes, and the shapes of the regions illustrated in the figures are intended to illustrate specific forms of regions of the elements and are not intended to limit the scope of the invention. Although the terms first, second, etc. in various embodiments of the present disclosure are used to distinguish between various components, these components should not be limited by these terms. These terms have only been used to distinguish one element from another. The embodiments described and exemplified herein also include their complementary embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Hereinafter, the present invention will be described in detail with reference to the drawings. In describing the specific embodiments below, various specific details have been set forth in order to explain the invention in greater detail and to assist in understanding it. However, it will be appreciated by those skilled in the art that the present invention may be practiced without these specific details. In some cases, it should be noted that parts of the invention that are commonly known to the skilled person to the art and are not significantly related to the invention may not be described herein in order not to unnecessarily obscure the present disclosure. In other instances, well-known process structures and/or processes have not been described in detail in order not to unnecessarily obscure the present disclosure.

Hereinafter, an electronic device having a flexible display panel according to a first embodiment according to the present invention will be described with reference to FIGS. 1 to 5.

In the following description of the present invention, only the components related to the features according to the present invention are described, and the descriptions of the remaining components as well known are omitted.

That is, the electronic device according to the present invention may be applied as an electronic device such as a tablet PC, a smart phone, a game machine, and the like. Although not shown, well known components are provided in the first unit body 100 and the second unit body 200 to implement various electronic device functions.

The electronic device according to the present invention includes a first unit body 100, a second unit body 200, a linking mechanism 300, a flexible display panel 400, and extending and retracting means 403.

The first unit body 100 and the second unit body 200 are each formed in a rectangular casing shape.

The linking mechanism 300 includes an elongate slot 307 and a linker 301.

Each of elongate slots 307 is defined within each side portion of the first unit body 100. The linker 301 connects the first unit body 100 and the second unit body 200. The linker 301 includes two lateral portions and two pivotal shafts extending between the two lateral portions. Hereinafter, the linker 301 generally refers to each of both lateral portions. One end of the linker is pivotally inserted into the elongate slot 307 and is configured to be slidable along the elongate slot 307. The other end of the linker 301 is pivotally installed on the second unit body 200, more strictly, on the outer side of the longitudinal end thereof. Specifically, a first pivotal shaft 304 and a second pivotal shaft 305 extend between both lateral portions of linkers 301. The first pivotal shaft 304 is pivotally mounted within a pivotal shaft receiving hole 308 formed in the longitudinal end of the second unit body 200. The second pivotal shaft 305 is inserted into the elongate slot 307, and is movable along the elongate slot 307, and is pivotally installed within the elongate slot 307.

In this connection, the first pivotal shaft 304 is referred to as a fixed pivotal shaft, while the second pivotal shaft 304 is referred to as a movable pivotal shaft.

Figure 2:
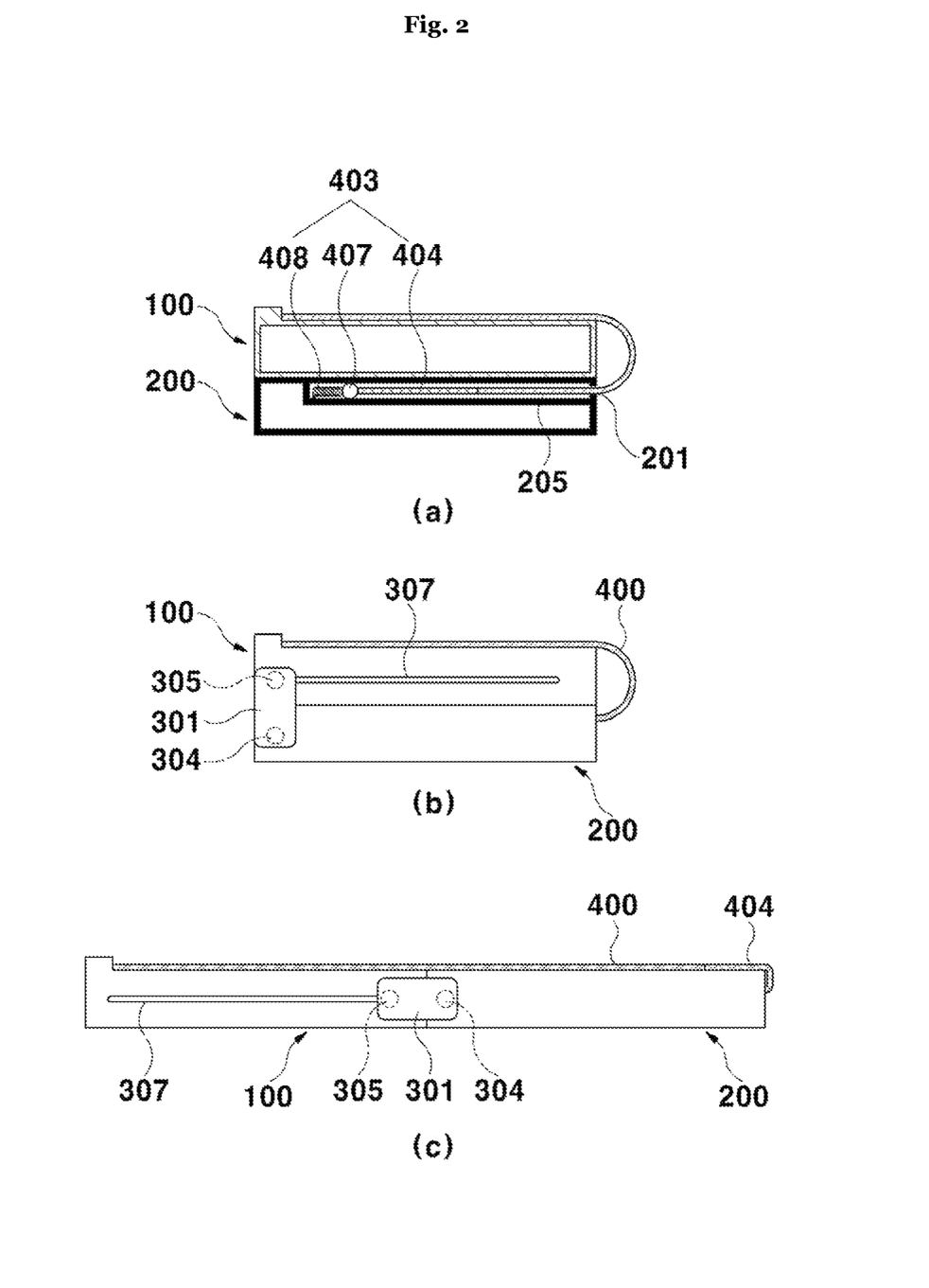
FIG. 2 shows the cross-section (a) and the state of use (b, c) of the electronic device in FIG. 1.

With the above configuration, referring to FIGS. 2b and 2c, the electronic device according to the present invention may be switched between an unfolded mode and a folded mode.

FIG. 2c corresponds to the unfolded mode, in which the first unit body 100 and the second unit body 200 are aligned with each other so that the top surfaces of both the first unit body 100 and the second unit body 200 face upwards and the first unit body 100 and second unit body 200 are coplanar and unfolded. FIG. 2b corresponds to folded mode, in which the first unit body 100 is stacked on the second unit body 200 and the top surface of the first unit body 100 faces upward.

In this connection, in the unfolded mode, the flexible display panel 400 extends on and along the top faces of the first unit body 100 and the second unit body 200, corresponding to the extended screen mode. In the folded mode, the flexible display panel 400 extends only on the top face of the first unit body 100, which corresponds to the reduced screen mode.

Figure 3:
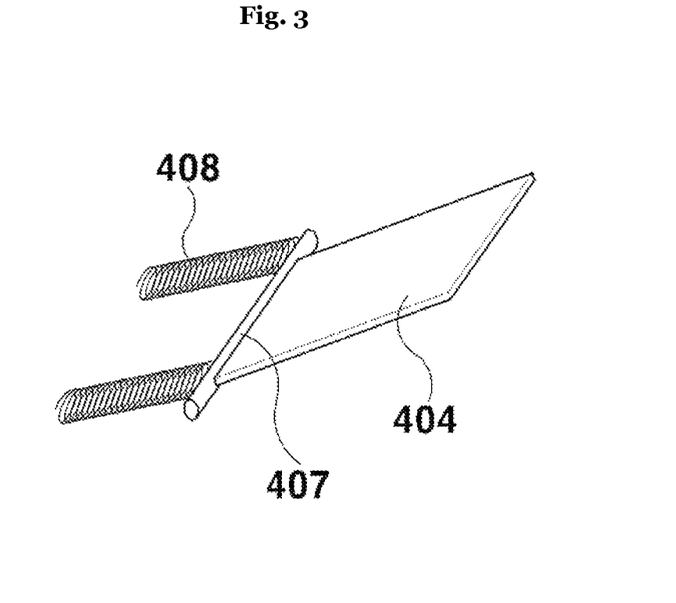
FIG. 3 shows another form of the linker shown in FIG. 1.

Referring to FIG. 3a, the linker 301 according to the present invention may have an extendable configuration. The linker 301 may be configured to provide a pulling force between the first unit body 100 and the second unit body 200. Specifically, the linker 301 includes a first stick portion 3011 in the form of a hollow tubular body, a second stick portion 3013 inserted in the first stick portion 3011 and slidable in the longitudinal direction therein, and an elastic member 3019. Both ends of the elastic member 3019 are coupled to a first fixed protrusion 3015 formed on the first stick portion 3011 and a second fixed protrusion 3017 formed on the second stick portion 3013, respectively. When the first stick portion 3011 and the second stick portion 3013 are stretched together, the elastic member 3019 provides an elastic force to allow the first stick portion 3011 and the second stick portion 3013 to return to its original state. In this connection, although not shown, a first pivotal shaft 304 and a second pivotal shaft 305 are formed on the respective ends of the first stick portion 3011 and the second stick portion 3013.

With the linker 301 having this configuration, when the electronic device according to the present invention is switched to the unfolded mode, the first unit body 100 and the second unit body 200 pull each other. As a result, the facing faces between the first unit body 100 and the second unit body 200 are in close contact with each other, so that the co-planar state between the first and second unit bodies 100 and 200 may be maintained.

Figure 6:
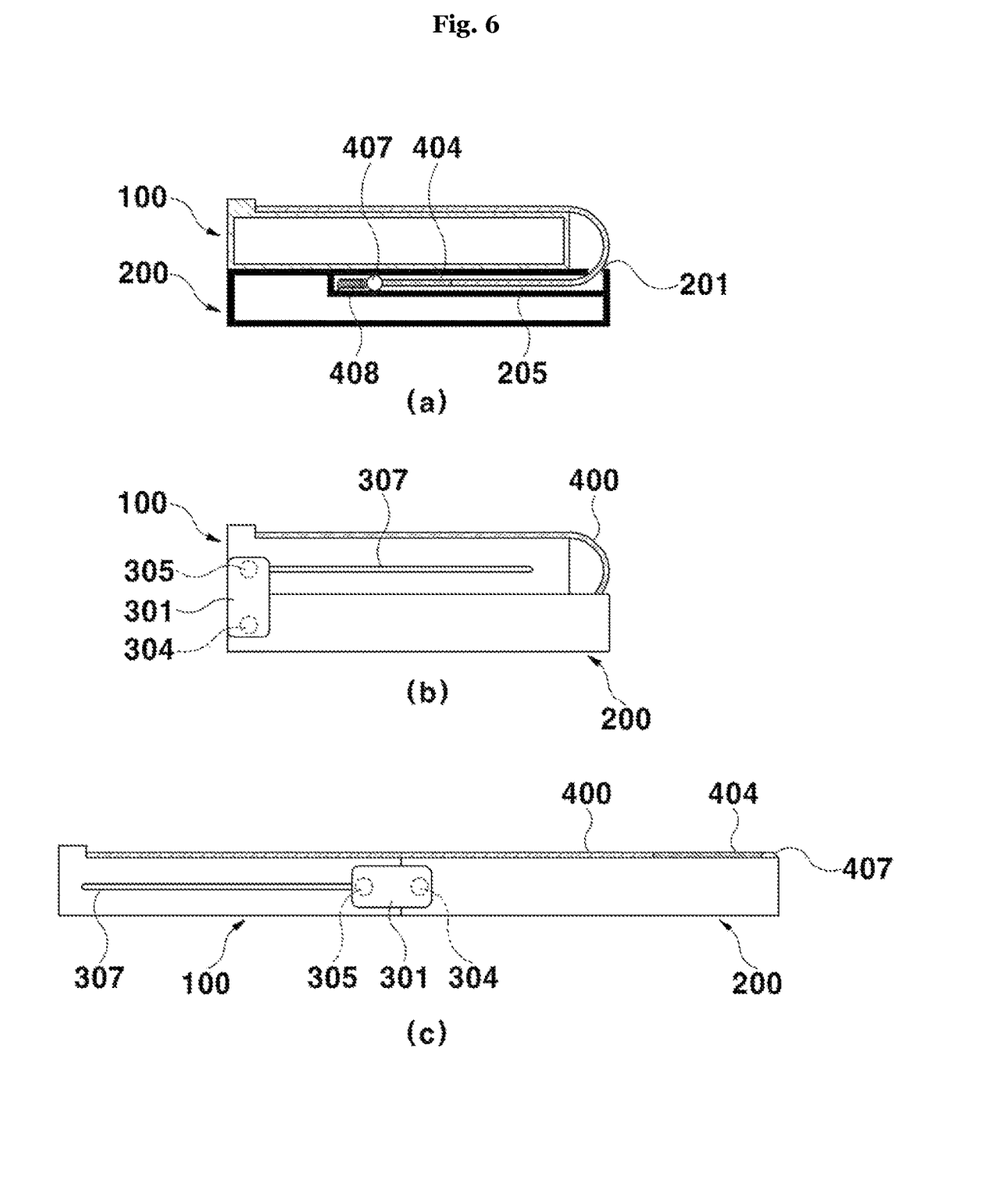
FIG. 6 shows an electronic device according to a second embodiment according to the present invention.

Meanwhile, as described above, the linker 301 according to the present invention may include the two stick portions 3011 and 3013 and one elastic member 3019. However, the present invention is not limited to this. As shown in FIG. 6b, the linker 301 according to the present invention comprises three stick portions 3021, 2022, and 3023 in the form of tubular bodies which are mutually-slidable and longitudinally-stretchable. In addition, there are a pair of elastic members 3025 which elastically interconnect the adjacent stick portions among the three stick portions to provide an elastic force therebetween.

Besides, if the linker 301 is retractable or extendable and can be returned to its original state from an extended state, various numbers of stick portions and elastic members may be considered. In addition, in the above embodiment, the stick portions have a tubular shape so as to enable mutual stable sliding. However, the present invention is not limited to this. As long as stick portions mutually adjacent to each other are capable of sliding each other, a configuration in which a guide rail is formed on a plate may be considered.

In this example, the elongate slot 307 is shown as formed on the side of the first unit body 100. However, the present invention is not limited thereto. The elongate slot may be formed on the top face or the bottom face of the first unit body 100.

Figure 1:
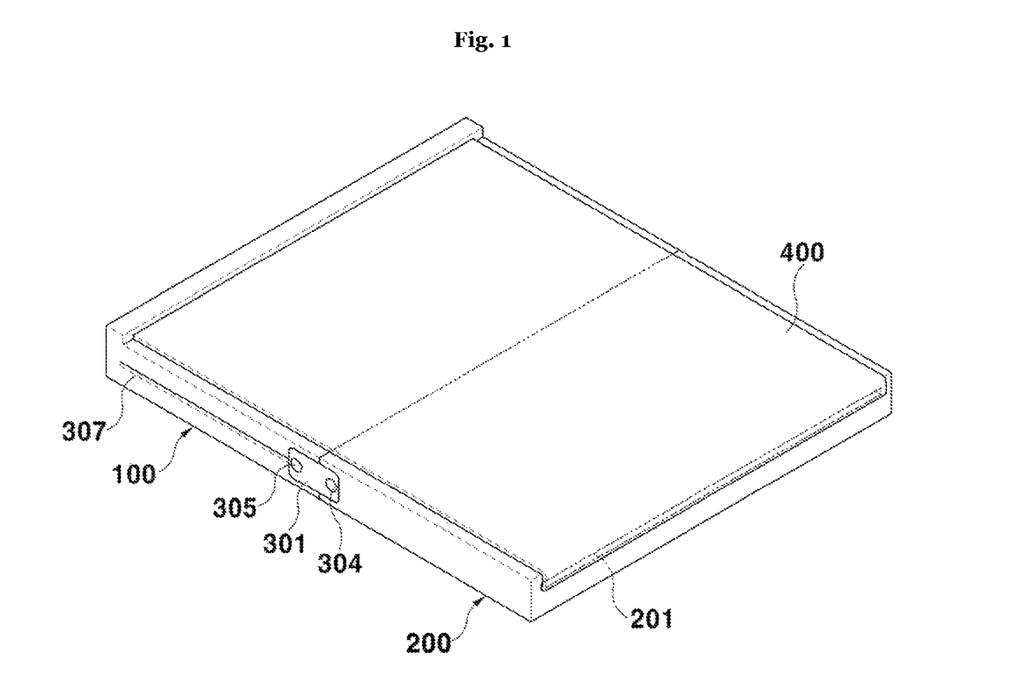
FIG. 1 is a perspective view of an electronic device according to the first embodiment according to the present invention.

Further, in this example, the elongate slot 307 is formed only in the first unit body 100 and the pivotal shaft receiving hole 308 is formed in the second unit body 200, as shown in FIGS. 1 and 2. One end of the linker 301 is pivotable relative to the first unit body 100 and is movable along the first unit body 100, while the other end of the linker 301 is pivotally inserted into the pivotal shaft receiving hole 308. However, the present invention is not limited thereto. According to the present invention, each elongate slot is formed in each of the first unit body 100 and the second unit body 200. The linker 301 may be inserted in the pair of the elongate slots and may be pivotable relative to the first unit body 100 and the second unit body 200 and may be movable along the pair of elongate slots. In addition, according to the present invention, the linker 301 may have a long length. Thus, when the first unit body 100 and the second unit body 200 are in the unfolded mode, the first unit body 100 and the second unit body 200 may be spaced apart from each other via the long length.

The flexible display panel 400 is implemented as a known flexible display panel that can flex freely, and the flexible display panel may have a touch function.

The flexible display panel 400 according to the present invention is configured to be drawn into the second unit body 200 or drawn out from the second unit body 20.

To this end, an accommodation chamber 205 is defined inside the second unit body 200. This accommodation chamber 205 communicates with an opening 201 defined in one end of the second unit body 200.

One end of the flexible display panel 400 is fixed to the distal end of the top face of the first unit body 100. The other end of the flexible display panel 400 is configured to be pulled into the accommodation chamber 205 or out of the accommodation chamber 205 through the opening 201 based on the arrangement mode between the first unit body 100 and the second unit body 200.

Figure 4:
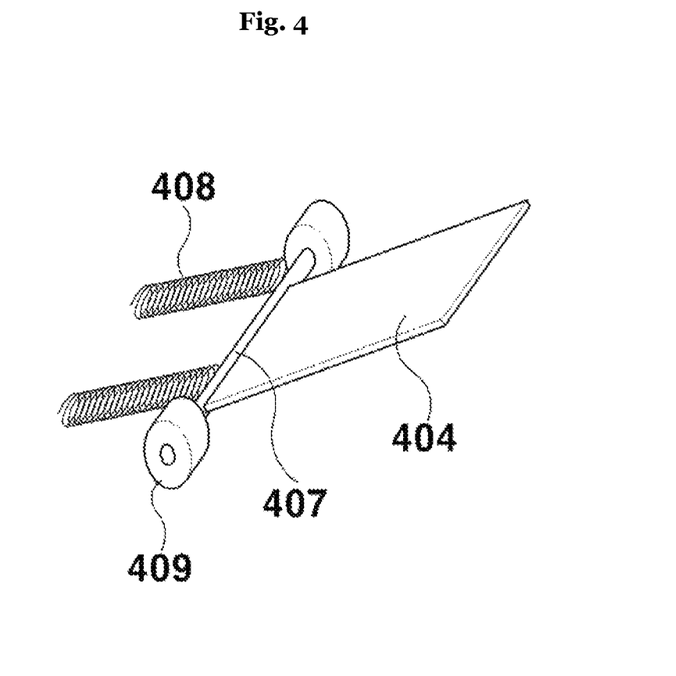
FIG. 4 is a perspective view of the stopper and first and second elastic members of FIG. 2.

Referring to FIG. 2a and FIG. 4, the extending and retracting means 403 is configured to allow the flexible display panel 400 to automatically enter the accommodation chamber 205 via the restoring elastic force of the extending and retracting means 403 when the flexible display panel 400 is drawn out from the accommodation chamber 205.

One end of the extending and retracting means 403 is fixed to one end of the accommodation chamber 205 and the other end of the extending and retracting means 403 is fixed to the proximal end of the flexible display panel 400.

Specifically, the extending and retracting means 403 according to the present invention includes a coil spring 408, an elastic pad 404, and a stopper 407.

One end of the coil spring 408 is fixed to one end of the accommodation chamber 205. The elastic pad 404 is implemented as a rubber pad with an elastic force and is connected, at one end thereof, to one end of the coil spring 408 and the proximal end of the flexible display panel 400 at the other end thereof.

The stopper 407 has a size larger than the opening 201. The stopper 407 is disposed within the accommodation chamber 205 and connects the coil spring 408 and the elastic pad 407 to each other.

If the first and second unit bodies 100,200 of the electronic device according to the present invention are switched by the user to the unfolded mode as shown in FIG. 2c and thus the flexible display panel 400 is withdrawn out of the internal space, the stopper 407 is blocked by the opening 201 so that the elastic pad 407 is withdrawn out of the accommodation chamber 205 but the coil spring 408 is not removed from the accommodation chamber 205.

In this example, the extending and retracting means 403 of the electronic device according to the present invention includes the coil spring 408, the elastic pad 404, and the stopper 407. The present invention is not limited thereto. Although not shown, the extending and retracting means 403 may include only a coil spring 408. In this case, one end of the coil spring 408 is fixed to one end of the accommodation chamber 205, and the other end of the spring 408 is fixed to the flexible display panel 400. Alternatively, the extending and retracting means 403 may include only an elastic pad 404. In this case, one end of the elastic pad 404 is fixed to the inner end of the accommodation chamber 205, and the other end of the pad 404 is fixed to the flexible display panel 400. In this connection, the stopper 407 may or may not be installed as needed. That is, stopper 407 is optional. The stopper 407 may be installed at the longitudinal end of the coil spring 408 or at the longitudinal end of the elastic pad 404. As an alternative, the stopper 407 may be installed between the coil spring 408 and the flexible display panel 400 or between the elastic pad 404 and the flexible display panel 400.

As described above, the extending and retracting means 403 according to the present invention may be composed only of the coil spring 408, or only the elastic pad 404, and may optionally include the stopper 407. As shown in FIG. 2, in the electronic device of the present invention, the extending and retracting means 403 includes the coil spring 408 and the elastic pad 404 having different elastic forces. The stopper 407 is provided between the coil spring 408 and the elastic pad 404. Accordingly, when the flexible display panel 400 is drawn out from the accommodation space, a force acts on the coil spring 408 and the elastic pad 404 in a dispersed manner. Then, the coil spring 408 and the elastic pad 404 each may extend by a predetermined length. Then, after the stopper 407 is blocked at the opening 201, only the elastic pad 404 is subjected to a force. As a result, only the elastic pad 404 is further stretched. As a result, the restoring force of the elastic pad 404 is not quickly lost, so that even when the coil spring 408 and the elastic pad 404 are used for a long time, the failure due to the performance degradation of the coil spring 408 and the elastic pad 404 may be prevented.

That is, when the flexible display panel 400 is pulled out of the inner space, the force concentrates on the coil spring 408 or the elastic pad 404 when the extending and retracting means 403 is composed only of the coil spring 408 or only of the elastic pad 404. As a result, they are liable to lose their resilience easily due to stress overload. However, in accordance with the present invention, the extending and retracting means 403 is implemented as a combination of a coil spring 408 and an elastic pad 404 having different elastic forces, with a stopper 407 between the coil spring 408 and the elastic pad 404. As a result, the restoring force of the coil spring 408 and the elastic pad 404 may be kept in good condition for a long time.

Moreover, according to the present invention, when the stopper 407 is implemented as a long round bar, as in FIG. 4, its length may be greater than the width of the opening 201. In this connection, the stopper 407 may be attached to the elastic pad 404 through an adhesive. Alternatively, a groove may be created in the outer circumferential surface of the stopper 407, and an elastic pad 404 may be inserted in the groove, thereby coupling the stopper 404 and the elastic pad 404 in a fitting manner.

Figure 5:
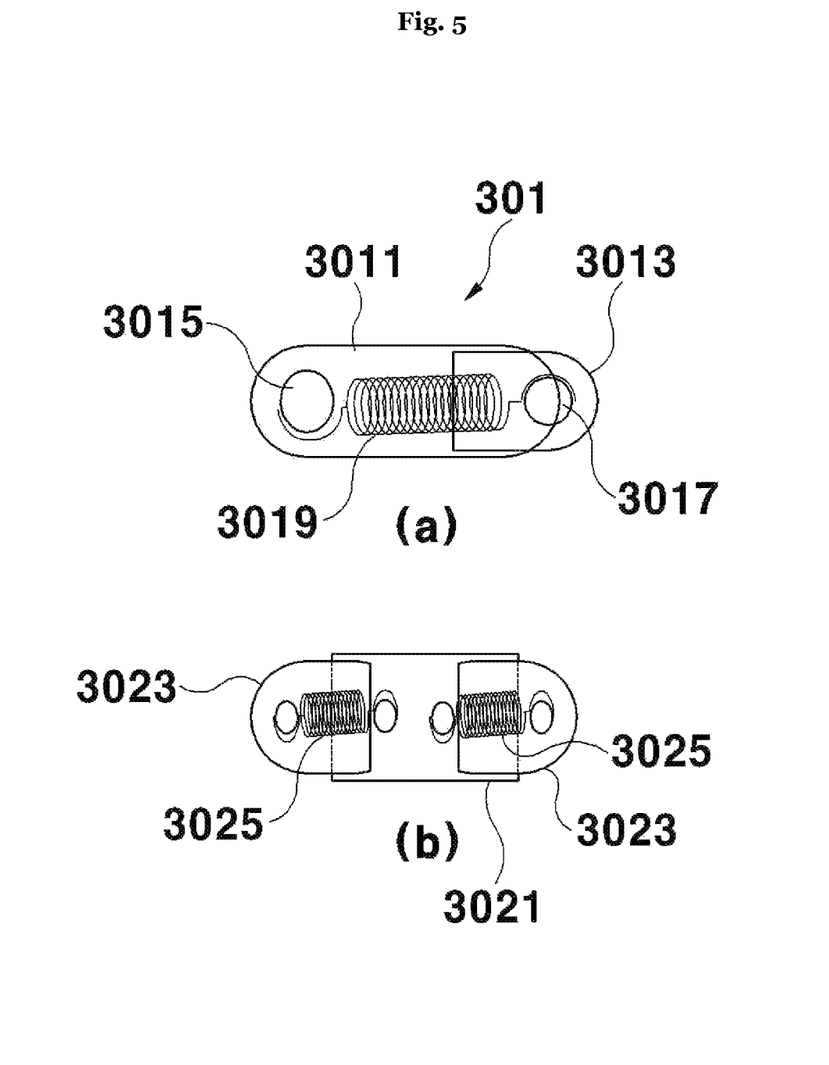
FIG. 5 is a perspective view showing another form of the stopper shown in FIG. 3.

Meanwhile, according to the present invention, as shown in FIG. 5, a roller 409 is rotatably installed at each of both ends of the stopper 407. The roller 409 may be moved in the accommodation chamber 205. This allows the stopper 407 to be moved more easily within the accommodation chamber 205.

The electronic device according to the present invention having the above-described configuration is easily manipulated by the user such that the first unit body 100 and the second unit body 200 are in the unfolded mode, as shown in FIG. 2c. In this case, the flexible display panel 400 is completely drawn out of the accommodation chamber 205 and extends on and along the top faces of the first unit body 100 and the second unit body. This corresponds to the extended screen mode. This allows the user to use the electronic device via the expanded flexible display panel 400.

In the case where the first unit body 100 is switched by the user into the folded mode in which the first unit body 100 is stacked on top of the second unit body 200, as in FIG. 2b, only a portion of the flexible display panel 400 is withdrawn out of the accommodation chamber 205. This corresponds to the reduced screen mode. This allows the user to use the electronic device via the reduced display panel 400.

In this manner, according to the present invention, the user may easily deform the first unit body 100 and the second unit body 200. In the reduced screen mode, that is, the folded mode, only a portion of the flexible display panel 400 is withdrawn out of the inner space and the remainder thereof is received in the accommodation chamber 205 of the second unit body 200. The portion of the flexible display panel 400 that is not exposed to the outside may be prevented from scratching or damaging.

FIG. 6 shows an electronic device according to a second embodiment which is substantially the same as the electronic device according to the first embodiment except for the positioning of the opening 201. That is, in the first embodiment, the opening 201 may be formed in the vertical side face of the second unit body 200 as shown in FIG. 2, while in the second embodiment, as shown in FIG. 6, the opening 201 may be formed in one end of the top face of the second unit body 200.

Figure 7:
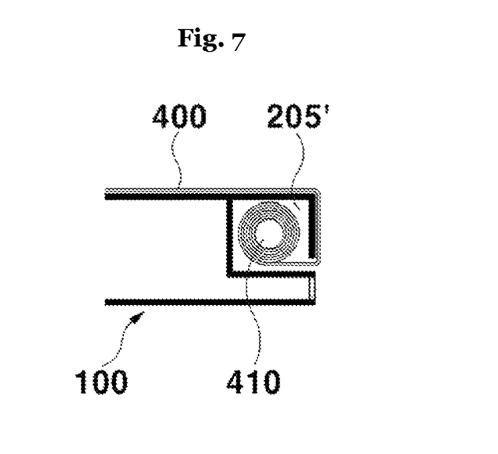
FIG. 7 is a cross-sectional view of a portion of an electronic device according to a third embodiment according to the present invention.
Figure 8:
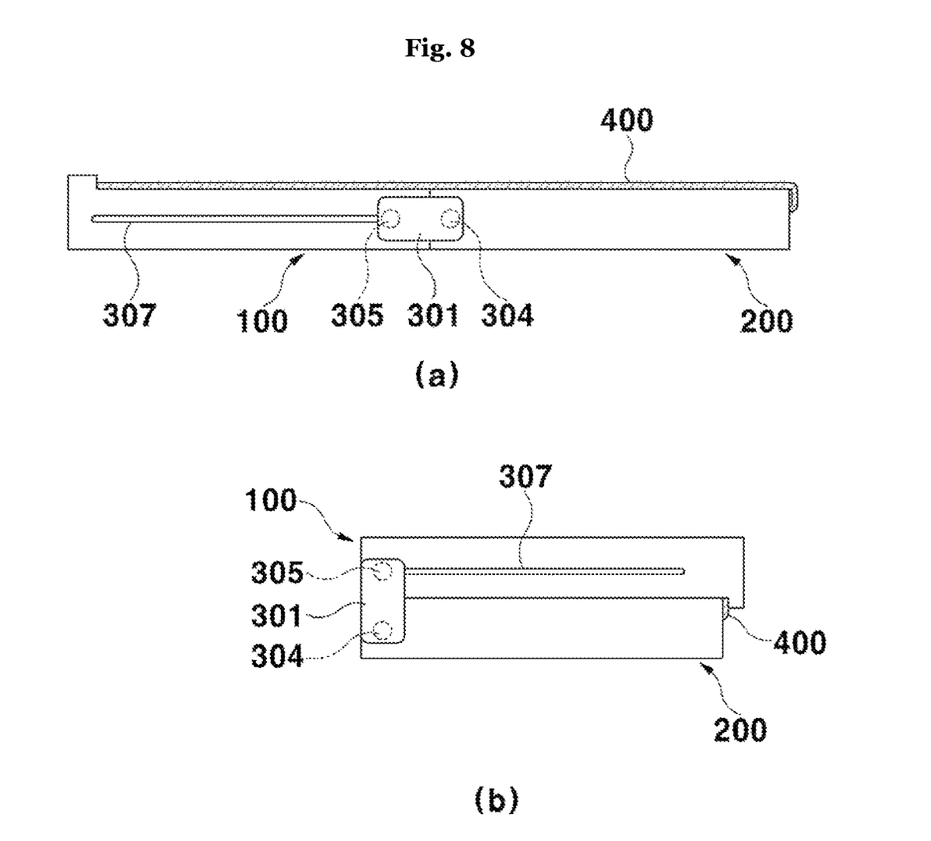
FIG. 8 shows an electronic device according to a third embodiment according to the present invention.

Referring to FIGS. 7 to 8, an electronic device according to the third embodiment according to the present invention will be described.

FIG. 7 and FIG. 8 show an electronic device according to a third embodiment which is substantially the same as the electronic device according to the first embodiment except for the configuration of the extending and retracting means. The remainder thereof is the same in terms of the configuration therebetween. Therefore, the same reference numerals are assigned to the same components in the following description of the third embodiment, and a description thereof will be omitted.

In the third embodiment, the accommodation chamber 205' is smaller than the accommodation chamber 205 of the first embodiment. The extending and retracting means 410 may be composed of a spiral spring type bobbin 410 rather than a coil spring or an elastic pad. The spiral spring type bobbin 410 is rotatably installed in the accommodation chamber 205'. The spiral spring type bobbin 410 is connected to the flexible display panel 400 so that the flexible display panel 400 may be wound or unwound along the spiral spring type bobbin 410. When the flexible display panel 400 is withdrawn out of the accommodation chamber 205', the spiral spring type bobbin 410 will have the force to automatically wind the flexible display panel 400 around the bobbin.

That is, when the user switches the first unit body 100 and the second unit body 200 to the unfolded mode as shown in FIG. 8a, the flexible display panel 400 is extracted from the spiral spring type bobbin 410. This corresponds to the extended screen mode. When the user switches the first unit body 100 and the second unit body 200 from the unfolded mode to the folded mode, the spiral spring type bobbin 410 automatically winds a portion of the flexible display panel 400 along the spiral spring type bobbin 410. Thus, a portion of the flexible display panel 400 is disposed only on the top face of the first unit body 100. This corresponds to the reduced screen mode. Meanwhile, according to the present invention, as shown in FIG. 8b, the first unit body 100 is stacked with the second unit body 200, and the first unit body 100 and the second unit body 200 overlap with each other. In this case, the entire flexible display panel 400 is wound into the spiral spring type bobbin 410 and is fully inserted into the accommodation chamber 205'. This mode may be referred to a non-display mode. Accordingly, when the electronic device is not in use, the user switches the first unit body 100 and the second unit body 200 to this non-display mode. Thus, the entire flexible display panel 400 may be received inside the accommodation chamber 205 of the second unit body 200. In this way, the flexible display panel 400 is not exposed to the outside, and the flexible display panel 400 can be safely protected.

Figure 9:
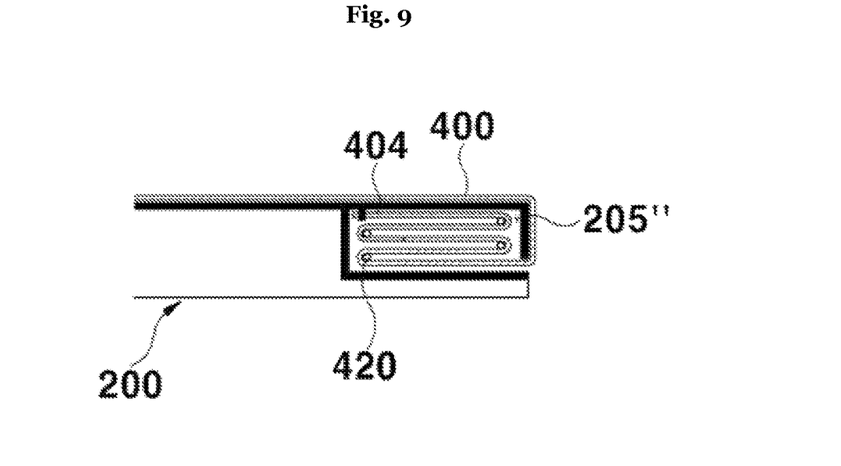
FIG. 9 is a cross-sectional view of a portion of an electronic device according to the fourth embodiment according to the present invention.

FIG. 9 shows an electronic device according to a fourth embodiment which is substantially the same as the electronic device according to the third embodiment except that the extending and retracting means is not implemented as the spiral spring type bobbin 410 but is implemented as an elastic pad 404 and a plurality of rollers 420. The remainder thereof is the same in terms of the configuration therebetween. Therefore, the same reference numerals are assigned to the same components in the following description of the fourth embodiment, and a description thereof will be omitted.

A plurality of rollers 420 are rotatably installed in the accommodation chamber 205'. One end of the elastic pad 404 is secured to the inner end of the accommodation chamber 205' while the other end of the pad is fixed to the flexible display panel 400. The rollers are configured such that the elastic pad 404 and the flexible display panel 400 are wound in a zigzag fashion.

In this case, the accommodation chamber 205' of the fourth embodiment is smaller than the accommodation chamber 205 according to the first embodiment. The elastic pad 404 and the display panel 400 are arranged in a multi-layered configuration in a small accommodation chamber 205'. With this, the elastic pad 404 and the flexible display panel 400 are wound in a zigzag fashion via a staggered configuration of the rollers.

Figure 10:
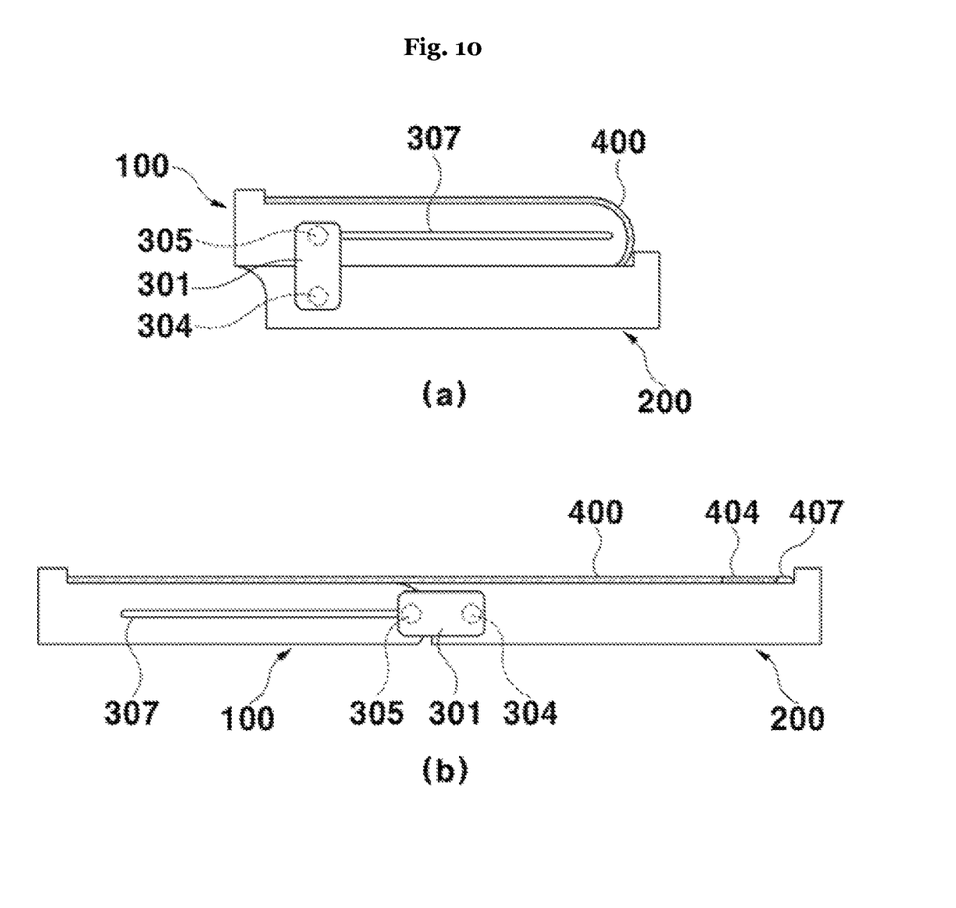
FIG. 10 shows an electronic device according to the fifth embodiment according to the present invention.
Figure 11:
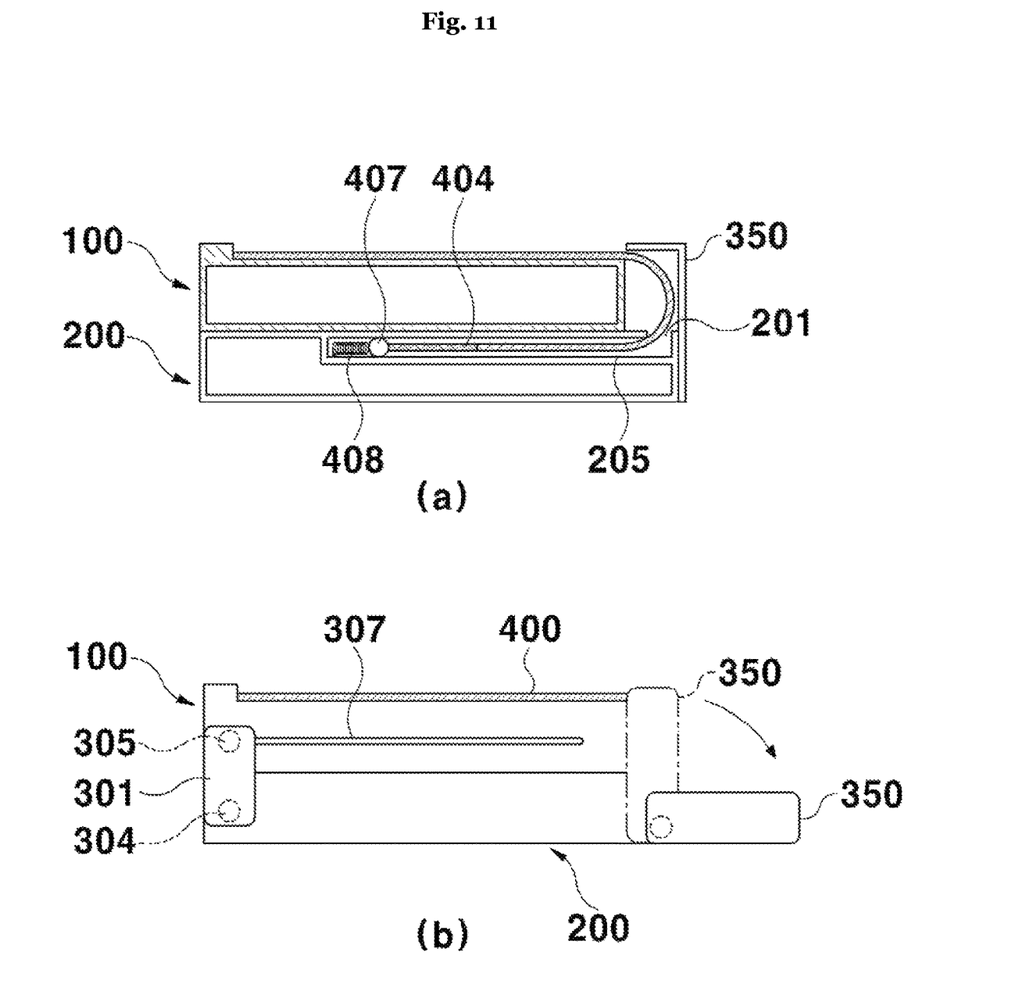
FIG. 11 shows a sixth embodiment in which a fixed cover is mounted on an electronic device according to the present invention.

Referring to FIG. 10, an electronic device according to a fifth embodiment according to the present invention is shown. In the electronic device according to the fifth embodiment according to the present invention, when the first unit body 100 and the second unit body 200 are switched to the unfolded mode, the side portions facing each other are rounded in a manner corresponding to each other. In this reduced screen mode (see FIG. 11a), the degree to which the flexible display panel 400 is pushed or bent by or against the first unit body 100 is mitigated, thereby minimizing damage of the flexible display panel 400.

Referring to FIG. 11, in an electronic device according to the sixth embodiment according to the present invention, a cover 350 is hingedly mounted on the side end of the second unit body 200. As shown in FIG. 11a, if the user switches the first and second unit bodies 100, 200 to the folded mode and the reduced screen mode is created, the exposed side of the display panel 400 when used in the reduced screen mode may be protected by covering the side end portion of the pulled-out flexible display panel 400 using the cover 350.

On the other hand, according to the present invention, the electronic device may be configured to different thicknesses of the first unit body 100 and the second unit body 200. In this case, when the first unit body 100 and the second unit body 200 are switched to the unfolded mode, support legs (not shown) may be disposed so that the top faces of the first unit body 100 and the second unit body 200 may be positioned on the same plane.

For example, if the first unit body 100 is thicker than the second unit body 200, support legs (not shown) may be placed on the second unit body 200. As a result, the second unit body 200 is raised upward from the support surface so that the top faces of the first unit body 100 and the second unit body 200 may be positioned on the same plane.

Figure 12:
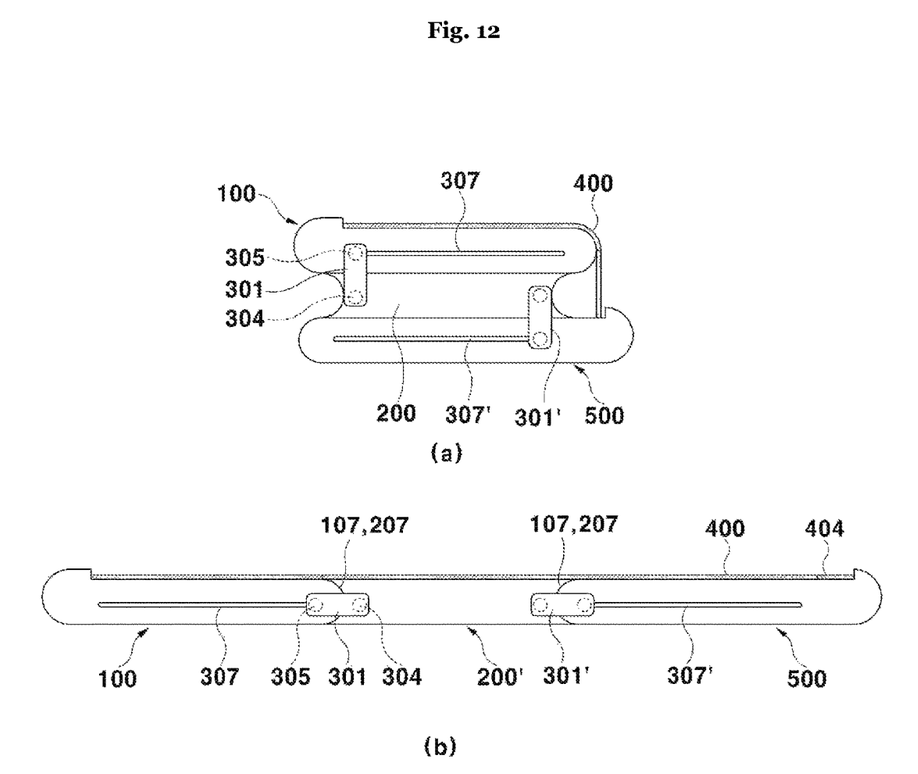
FIG. 12 shows an electronic device according to the seventh embodiment according to the present invention.

Hereinafter, an electronic device according to a seventh embodiment according to the present invention will be described with reference to FIG. 12.

In the first to sixth embodiment described so far, two unit bodies, that is, the first unit body 100 and the second unit body 200 were present. The present invention is not limited to this. An electronic device according to a seventh embodiment according to the present invention shown in FIG. 12 may include three unit bodies 100, 200, and 500. The three unit bodies 100, 200, and 500 may be stacked on each other or may be spread out with respect to each other. To this end, the adjacent unit bodies are connected by a corresponding linking mechanism 301, 301', 307 or 307'. In this case, a larger extended screen could be implemented compared to the previous embodiments.

In this example, although the internal configuration of the third unit body 500 is not shown, those skilled in the art will appreciate that an accommodation chamber for receiving the flexible display panel 400 is formed inside the third unit body 500 and the extending and retracting means 404 having the above-mentioned various configurations may be disposed inside the chamber.

In this way, the present invention may be implemented in various ways, including varying numbers of unit bodies and varying numbers of linking mechanisms.

While the present invention has been shown and described with reference to a preferred embodiments for illustrating the principle of the present invention, the present invention is not limited to the exact configuration and effect as illustrated and described. It will be appreciated by those skilled in the art that various changes in form and details may be made thereto without departing from the spirit and scope of the appended claims. Accordingly, all such appropriate modifications and changes, and equivalents thereof, should be regarded as falling within the scope of the present invention.

INDUSTRIAL AVAILABILITY

The present invention is directed to the electronic device with the flexible display panel. Thus, the present invention may be widely used in the field of electronic device industry.

What is claimed is:

1. An electronic device comprising:
   a first unit body and a second unit body;
   a linkage connecting the first unit body and the second unit body to each other, wherein the linkage is configured to allow the first unit body and the second unit body to be switched between a folded mode or an unfolded mode, wherein in the folded mode, the first unit body and the second unit body overlap each other, while, in the unfolded mode, the first unit body and the second unit body are unfolded to be linear;
   an accommodation chamber formed in the second unit body;
   an opening defined at a lateral end of the second unit body;
   a flexible display panel having one end fixed at one end of a top face of the first unit body and having the other end being retracted into or withdrawn out of the accommodation chamber based on the folded or unfolded mode; and
   an extendable and retractable connector disposed in the accommodation chamber, wherein the extendable and retractable connector is connected to the flexible display panel, wherein the extendable and retractable connector is configured to pull the flexible display panel such that the flexible display panel is automatically retracted into the accommodation chamber when the flexible display panel is pulled out, wherein the extendable and retractable connector comprises:
a coil spring whose one end is fixed to an inner end of the accommodation chamber;
an elastic pad connecting one end of the coil spring and the flexible display panel; and
a stopper disposed between the coil spring and the elastic pad, wherein the stopper has a size larger than the opening so as not to pass through the opening, thereby preventing the coil spring from escaping out of the accommodation chamber.

2. The device of claim 1, wherein in the unfolded mode, both top faces of the first unit body and of the second unit body face upwards, wherein in the folded mode, only the top face of the second unit body faces upwards,
wherein in the unfolded mode, the flexible display panel is withdrawn out of the accommodation chamber and extends across the top faces of the first unit body and the second unit body, thereby creating an extended screen mode,
wherein in the folded mode, the flexible display panel is partially withdrawn out of the accommodation chamber and extends only across the top face of the first unit body, thereby creating a reduced screen mode.

3. The device of claim 1, wherein, in the unfolded mode, both top faces of the first unit body and of the second unit body face upwards, wherein in the folded mode, only the top face of the second unit body faces upwards,
wherein in the unfolded mode, the flexible display panel is withdrawn out of the accommodation chamber and extends across the top faces of the first unit body and the second unit body, thereby creating an extended screen mode,
wherein in the folded mode, the flexible display panel is partially withdrawn out of the accommodation chamber and extends only across the top face of the first unit body, thereby creating a reduced screen mode,
wherein in an inverse-folded mode, the first unit body and the second unit body overlap each other such that the top faces of the first unit body and the second unit body face each other,
wherein in the inverse-folded mode, an entirety of the flexible display panel is received in the accommodation chamber.

4. The device of claim 1, wherein the linkage includes:
an elongate slot formed in the first unit body; and
a linker connecting the first unit body and the second unit body, wherein one end of the linker is movable along the elongate slot, and is pivotable in the elongate slot, and the other end of the linker is pivotally mounted on the second unit body.

5. The device of claim 4, wherein the linker is elastic and extendable, wherein the linker allows the first unit body and the second unit body to pull each other such that the first unit body and the second unit body is brought into close contact side by side with each other in the unfolded mode when the first unit body and the second unit body are unfolded to be linear.

6. The device of claim 4, wherein the linker has:
a first pivotal shaft movable along the elongate slot and pivotable in the elongate slot while being inserted into the elongate slot, wherein the first shaft is disposed on one end of the linker; and
a second pivotal shaft position-fixed onto the second unit body, wherein the second pivotal shaft is pivotable.

7. The device of claim 1, wherein the linkage includes:
a first elongate slot formed in the first unit body;
a second elongate slot formed in the second unit body; and
a linker connecting the first unit body and the second unit body, wherein one end of the linker is movable along the first elongate slot, and is pivotable in the first elongate slot, and the other end of the linker is movable along the second elongate slot, and is pivotable in the second elongate slot.

8. The device of claim 1, wherein the extendable and retractable connector includes a coil spring, an elastic pad, or a combination of a coil spring and an elastic pad.

9. The device of claim 8, wherein the extendable and retractable connector further includes a stopper disposed at a longitudinal end of the coil spring or the elastic pad, or between the flexible display panel and the elastic pad, wherein the stopper prevents a portion or entirety of the elastic pad from being removed from the accommodation chamber.

10. An electronic device comprising:
a first unit body and a second unit body;
a linkage connecting the first unit body and the second unit body to each other, wherein the linkage is configured to allow the first unit body and the second unit body to be switched between a folded mode or an unfolded mode, wherein in the folded mode, the first unit body and the second unit body overlap each other, while, in the unfolded mode, the first unit body and the second unit body are unfolded to be linear;
an accommodation chamber formed in the second unit body;
an opening defined at a lateral end of the second unit body;
a flexible display panel having one end fixed at one end of a top face of the first unit body and having the other end being retracted into or withdrawn out of the accommodation chamber based on the folded or unfolded mode; and
an extendable and retractable connector disposed in the accommodation chamber, wherein the extendable and retractable connector is connected to the flexible display panel, wherein the extendable and retractable connector is configured to pull the flexible display panel such that the flexible display panel is automatically retracted into the accommodation chamber when the flexible display panel is pulled out,
wherein the linkage includes:
an elongate slot formed in the first unit body; and
a linker connecting the first unit body and the second unit body, wherein one end of the linker is movable along the elongate slot, and is pivotable in the elongate slot, and the other end of the linker is pivotally mounted on the second unit body,
wherein the linker is elastic and extendable, wherein the linker allows the first unit body and the second unit body to pull each other such that the first unit body and the second unit body is brought into close contact side by side with each other in the unfolded mode when the first unit body and the second unit body are unfolded to be linear,
wherein the linker includes:
a first stick;
a second stick portion slidable in a longitudinal direction along the first stick; and
an elastic spring connecting the first stick and the second stick.

11. An electronic device comprising:
a first unit body and a second unit body;

a linkage connecting the first unit body and the second unit body to each other, wherein the linkage is configured to allow the first unit body and the second unit body to be switched between a folded mode or an unfolded mode, wherein in the folded mode, the first unit body and the second unit body overlap each other, while, in the unfolded mode, the first unit body and the second unit body are unfolded to be linear;

an accommodation chamber formed in the second unit body;

an opening defined at a lateral end of the second unit body;

a flexible display panel having one end fixed at one end of a top face of the first unit body and having the other end being retracted into or withdrawn out of the accommodation chamber based on the folded or unfolded mode; and an extendable and retractable connector disposed in the accommodation chamber, wherein the extendable and retractable connector is connected to the flexible display panel, wherein the extendable and retractable connector is configured to pull the flexible display panel such that the flexible display panel is automatically retracted into the accommodation chamber when the flexible display panel is pulled out, wherein the linkage includes:

an elongate slot formed in the first unit body; and a linker connecting the first unit body and the second unit body, wherein one end of the linker is movable along the elongate slot, and is pivotable in the elongate slot, and the other end of the linker is pivotally mounted on the second unit body, wherein the linker is elastic and extendable, wherein the linker allows the first unit body and the second unit body to pull each other such that the first unit body and the second unit body is brought into close contact side by side with each other in the unfolded mode when the first unit body and the second unit body are unfolded to be linear, wherein the linker includes:

a plurality of sticks that are slidably movable mutually in an length direction thereof and extend and retract; and elastic springs, each connecting adjacent sticks, wherein each elastic spring provides restoring force corresponding adjacent sticks when the corresponding adjacent sticks are stretched together.

* * * * *